(12) United States Patent
Granbery et al.

(10) Patent No.: US 9,704,149 B2
(45) Date of Patent: Jul. 11, 2017

(54) SYSTEMS AND METHODS FOR PREFERRED PAYMENTS USING BEACONS

(71) Applicant: EBAY INC., San Jose, CA (US)

(72) Inventors: John Hastings Granbery, Los Altos, CA (US); Geoffrey W. Chatterton, Santa Clara, CA (US)

(73) Assignee: PayPal, Inc., San Jose, CA (US)

( * ) Notice: Subject to any disclaimer, the term of this patent is extended or adjusted under 35 U.S.C. 154(b) by 168 days.

(21) Appl. No.: 14/335,729

(22) Filed: Jul. 18, 2014

(65) Prior Publication Data
US 2016/0019522 A1    Jan. 21, 2016

(51) Int. Cl.
G06K 5/00    (2006.01)
G06Q 20/22    (2012.01)
G06Q 20/20    (2012.01)
G06Q 20/32    (2012.01)
G06Q 20/42    (2012.01)

(52) U.S. Cl.
CPC .......... *G06Q 20/227* (2013.01); *G06Q 20/20* (2013.01); *G06Q 20/202* (2013.01); *G06Q 20/3224* (2013.01); *G06Q 20/3278* (2013.01); *G06Q 20/42* (2013.01)

(58) Field of Classification Search
USPC .......................................... 235/380; 705/21
See application file for complete search history.

(56) References Cited

U.S. PATENT DOCUMENTS

| | | | |
|---|---|---|---|
| 8,566,168 B1 | 10/2013 | Bierbaum et al. | |
| 2002/0062249 A1 * | 5/2002 | Iannacci | G06Q 20/10 705/14.1 |
| 2010/0061294 A1 | 3/2010 | Proctor, Jr. et al. | |
| 2010/0262537 A1 | 10/2010 | Park | |
| 2014/0136400 A1 | 5/2014 | Espey, III et al. | |
| 2014/0149293 A1 | 5/2014 | Laracey | |

* cited by examiner

*Primary Examiner* — Rafferty Kelly
(74) *Attorney, Agent, or Firm* — Haynes and Boone, LLP

(57) ABSTRACT

Systems and methods are provided for configuring a user device to provide a preferred payment method for payments. When a user carries their device into a store, the device may receive information from a beacon at the store that informs the device that the user is at the store. The user device may the use the information to determine which of several payment methods will provide a maximum benefit to the user if used for a payment at that store. The benefits to the user may include points, store rewards, miles, cash back rewards or other rewards associated with a particular payment method that, at a particular time or location provide more benefit to the user than other payment methods. The user device may be configured to provide the preferred payment method prior to a communication between the user device and a point of sale device of the store.

20 Claims, 8 Drawing Sheets

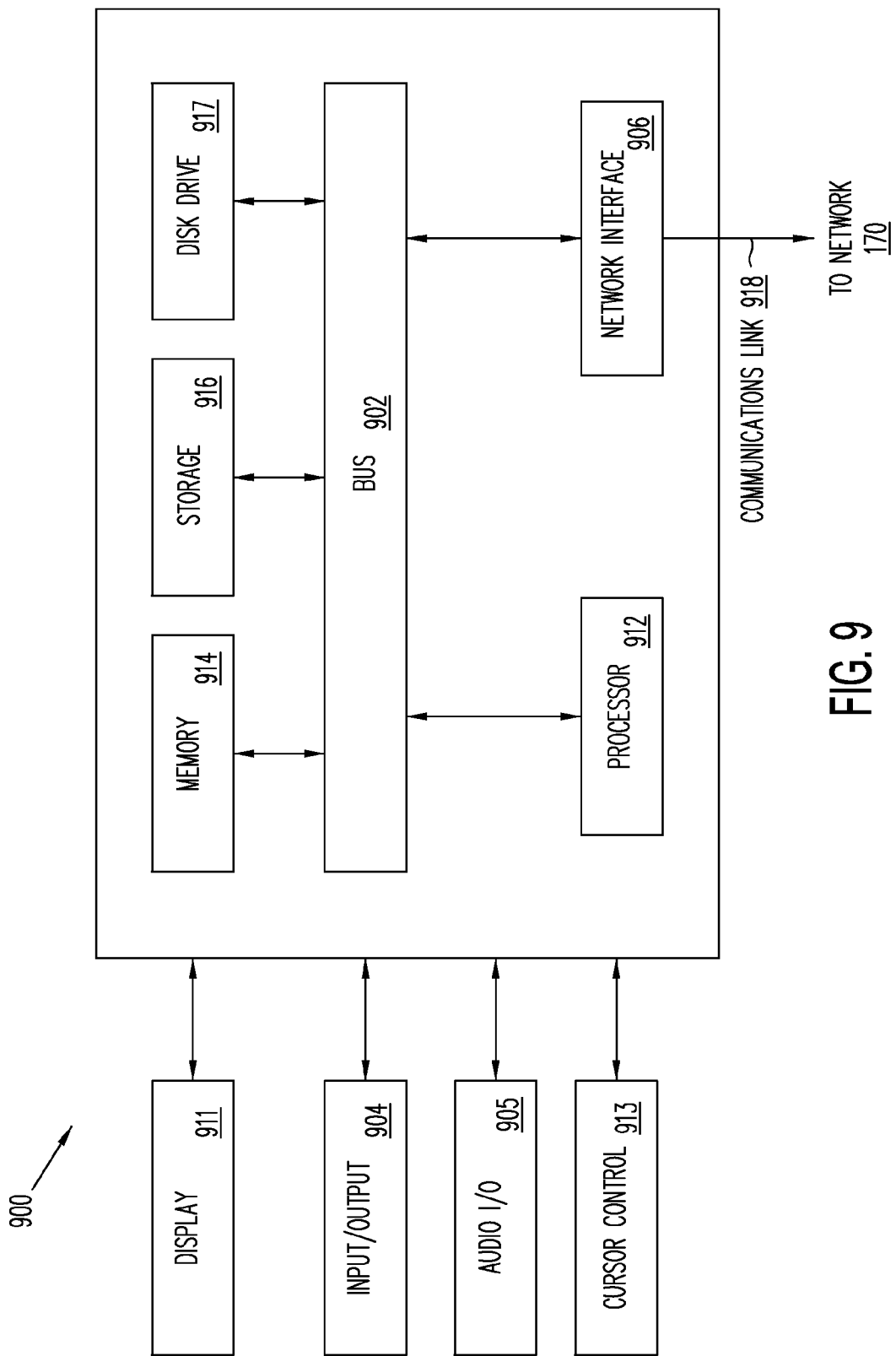

US 9,704,149 B2

SYSTEMS AND METHODS FOR PREFERRED PAYMENTS USING BEACONS

TECHNICAL FIELD

The present invention generally relates to electronic commerce and, more particularly, to systems and methods for financial transactions using preferred payment methods determined using beacons.

BACKGROUND

Mobile devices have been and are being used to make payments through payment providers, such as PayPal, Inc. of San Jose, Calif. Such payment providers typically allow a consumer to make a payment through the user's mobile device, such as through the use of barcodes, communication between the payment provider and the merchant, and other methods. After authentication and/or authorization, the payment is made through a user account with the payment provider, where the account is funded through a funding source, such as the user's bank account or credit card. The funding source is typically a single default source selected by the user.

In most cases, the payment system will select a default funding source. This may result in the use of a funding source that is not necessarily the "best" choice for a particular transaction. In order to remedy this, some systems have been developed that, when the user attempts to make the payment, the payment provider actively selects, on behalf of the user and during the payment transaction, the "best" funding source. However, these systems require communication with a particular payment provider server that has access to all of the available funding sources for the user. Because merchant payment devices can differ, a user can therefore experience a varied and sometimes undesirable payment experience.

Moreover, in some situations it can be difficult to perform funding selection operations during a payment transaction without disrupting secure communications that are subject to strict content protocol and timing requirements for financial transactions.

Therefore, a need exists for a payment solution that overcomes the disadvantages described above with conventional payment methods.

BRIEF DESCRIPTION OF THE DRAWINGS

FIG. 9 is a block diagram of a computer system suitable for implementing one or more components in FIG. 1, according to an embodiment.

Figure 1:
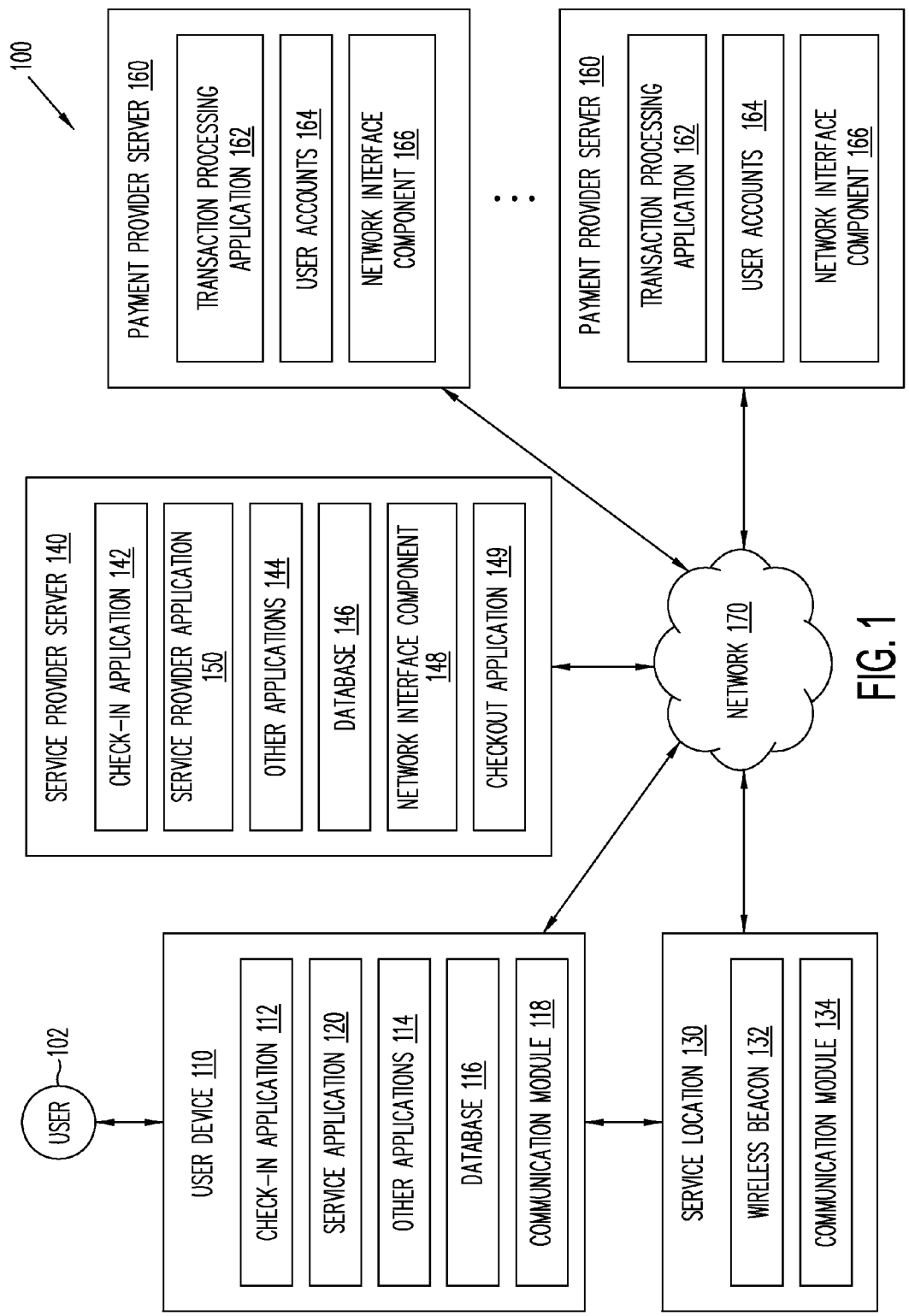
FIG. 1 is a block diagram of an illustrative networked system suitable for implementing processes for facilitating preferred payments using beacons, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Various locations provide equipment for communications with a user device of a user at the location. The equipment may include wireless communications equipment such as short range wireless communications equipment or other wireless communications equipment. The equipment may sometimes be referred to as beacon equipment or beacons. Wireless communications equipment that may be included in a beacon at a location may include Bluetooth Low Energy (BLE) beacon communications equipment, LTE Direct communications equipment, wireless local area network equipment (e.g., WiFi based equipment), cellular network equipment, global positioning system (GPS) equipment, combined cellular and GPS equipment, other radio or microwave based communications equipment, infrared communications equipment, and/or any combination thereof.

The beacons may communicate with the user device to provide the user device with merchant information such as merchant location information, a merchant name, a class of business, and/or a type of transaction (as examples). For example, when a user carriers their mobile device into a location such as a merchant location, a beacon located at or near an entrance to the location may communicate with the mobile device to receive identifying information of the user and/or to inform the user device (e.g., by providing the merchant information) which merchant the user has entered. The beacon may also inform the user device (e.g., by providing the merchant information) of the type of merchant and/or product that is sold at the merchant.

The user device may include a mobile wallet application that can be used to make payments at the merchant. For example, the merchant may have a point of sale (POS) device that communicates with the user device at the point of sale when the user is checking out in order to process a payment for one or more items and/or services from the merchant. In one embodiment, the POS device may be a near field communications (NFC) device that initiates a payment transaction when the user taps, swipes or otherwise provides their mobile device within the proximity of the NFC device. The NFC device may recognize the presence of the user device, request a payment instrument from the user device, receive a preferred payment instrument or a dynamically ordered list of preferred payment instruments from the user device, and communicate with one or more payment provider servers to process the payment using the preferred payment instrument or a selected one of the preferred payment instruments in the dynamically ordered list. However, this is merely illustrative. In various embodiments, a POS device may communicate with the user device to receive a preferred payment instrument using other means other than NFC communications. For example, in one embodiment, the user device may generate a scannable code such as a bar code on a display of the device that includes information indicating the preferred payment instrument. The scannable code may be scanned by the POS device.

In one embodiment, the preferred payment instrument may be the only payment instrument provided to the NFC device. The preferred payment instrument may be determined by the user device based on the communications with the beacon when the user entered the merchant location. The mobile wallet application can be configured to provide only the preferred payment instrument when a request is received from the POS device. In this way, the mobile device of the user and/or a payment provider server associated with the beacon can perform funding selection operations while the user shops at the merchant and before payment operations are initiated. This can provide the benefit over conventional systems that funding selection operations need not be performed during payment operations and that additional time may be provided for the funding selection operations, thereby allowing gathering and comparison of information such as rewards information, points information, discount information, user preferences, merchant incentive information and/or other information for determining a payment instrument for the user that provides the greatest benefit for the user.

Moreover, the payment operation using the POS device can, but need not, include any communication with a payment provider server capable of performing any funding selection operations. In this way, users may be provided with the ability to perform payment operations using preferred payment instruments, without having to self-select the preferred payment instrument and without requiring the merchant to have a specially equipped point of sale system that can access and analyze user preferences, reward information, and/or other information for selecting payment instruments for the user.

A service provider may include one or more locations such as merchant locations where the service provider offers products, services, or other items to users. Items, as used herein, may include physical goods, digital goods, services, donations, and anything that the user is making a payment for, to, or regarding. The service location(s) may utilize short range wireless beacons to communicate with mobile user devices of the users. The short range wireless beacons may employ, for example, BLE communications that emit a signal receivable by a user device. The communication may include an identifier for the beacon. A user device may passively monitor for beacon communications such as BLE communications. When a user device detects a beacon signal such as a BLE signal and verifies the identifier as belonging to a particular location such as a merchant location, both the user device and the beacon may ramp up in power and establish a connection. The connection may further enable the user device to communicate with a service provider device and/or server. The beacon may be connected to a networked device at the service location, or the beacon may include network functionality to communicate with the service provider server.

FIG. 1 is a block diagram of a networked system 100 suitable for implementing processes for preferred payments using beacons, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 may include one or more users such as user 102, each having a user device 110, a service location 130, a service provider server 140, and one or more payment provider servers 160 in communication over a network 170. Each user 102 (e.g., a visitor to a service location such as a shopper at a merchant location), may utilize their corresponding user device 110 to check-in to service provider server 140. Service location 130 may correspond to a merchant location such as a store, a hotel, a restaurant, an entertainment location such as an arena, a stadium, a theater, an amusement park or any other location that offers goods and/or services for sale or otherwise accepts payments for goods, services, and/or donations. Service provider server 140 may correspond to a general server for multiple service locations (e.g. a server for a merchant chain) or may be specific to only service location 130 (e.g. a server for a particular merchant).

Check-in of users 102 may be accomplished through a beacon 132 (e.g., a wireless beacon) at service location 130, through a social media application or website or by other check-in equipment.

User device 110, service location 130, and service provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

User device 110 may be implemented using any appropriate hardware and software such as hardware and software configured for wired and/or wireless communication with beacon 132 and service provider server 140. For example, in one embodiment, user device 110 may be implemented as a personal computer (PC), a smart phone, personal digital assistant (PDA), laptop computer, wristwatch with appropriate computer hardware resources, eyeglasses with appropriate computer hardware (e.g. GOGGLE GLASS®) and/or other types of computing devices capable of transmitting and/or receiving data, such as an IPAD® from APPLE®. The user device may be managed or controlled by any suitable processing device.

As shown in FIG. 1, user device 110 may contain a check-in application 112, a service application 120, other applications 114, a database 116, and a communication module 118. Check-in application 112, service application 120, and other applications 114 may correspond to processes, procedures, and/or applications executable by a hardware processor, for example, a software program. In other embodiments, user device 110 may include additional or different software as required.

Check-in application 112 may be used by the user 102 of user device 110 to establish a connection between user device 110 and service provider server 140. Check-in application 112 may correspond to a specific application utilized by user device 110 with service provider server 140 to complete a check-in with service provider server 140. The check-in with service provider server 140 may correspond to a process to log in to a user account of user 102 with service provider server 140. In other embodiments, the check-in may provide and/or verify an identity of user 102, including transmission of an identifier for user 102 and/or user device 110. The check-in may be completed over network 170 with service provider server 140. In such embodiments, check-in application 112 may correspond more generally to a browser application configured to communicate with service provider server 140.

Check-in application 112 may also correspond to an application available over the Internet for download from service provider server 140 and/or other server corresponding to service location 130. Check-in application 112 may utilize communications module 118 to exchange short range wireless communications with beacon 132 at service location 130 to complete a check-in process. For example, service location 130 may include infrastructure with beacon 132 to communicate with user device 110 and complete the check-in process with service provider server 140. Beacon 132 may be configured to transmit an identifier for reception by user device 110.

Check-in application 112 may execute in the background of an operating system of user device 110 and be configured to establish connections, using communication module 118 of that user device 110, with one or more beacons 132 (e.g., wireless beacons) at service location 130. The connection may be established with or without user input from user 102. For example, beacon 132 may broadcast a token, such as a universally unique identifier (UUID), for reception by check-in application 112. Check-in application 112 may utilize communication module 118 of the user device 110 to receive the token from beacon 132. If check-in application 112 acknowledges the UUID as identifying service location 130, beacon 132, and/or service provider server 140, check-in application 112 may transmit an identifier corresponding to a user 102 and/or a user device 110 back to beacon 132. Check-in application 112 may utilize communication module 118 to communicate with beacon 132 (e.g., over near field communication, Bluetooth, Bluetooth Low Energy, radio, infrared, WiFi, cellular, GPS, combined cellular and GPS, microwave, a combination thereof, or other connection). The identifier from user device 110 may include, be transmitted with, concatenated with, or otherwise bundled with the identifier received from beacon 132.

Once a connection is established with beacon 132, user device 110 may be checked-in with service provider server 140 if the user 102 of that device is not currently checked-in. The check-in process may then associate that user 102 with the beacon 132 used to check-in that user 102 and/or other wireless beacons at the service location. In such embodiments, check-in application 112 of user device 110 may utilize short range wireless communication with beacon 132, such as near field communication, Bluetooth, Bluetooth Low Energy, radio, infrared, WiFi, cellular, GPS, combined cellular and GPS, microwave, a combination thereof, or other connection. Where beacon 132 corresponds generally to service location 130 or a location in or around service location 130, user 102 may be associated with service location 130 or a particular location in or around service location 130. Thus, user 102 may be associated with the location of that beacon and/or other nearby beacons.

Check-in application 112 may receive information from service provider server 140 and/or one or more payment provider servers 160. For example, check-in application 112 may receive merchant information such as a merchant identifier and/or a merchant location, maps, processes to request assistance from the service provider, etc. The information that is passed to check-in application 112 may be generally based on service location 130, such as a products and/or services that are offered for sale at service location 130 or other information about and/or associated with service location 130. Additionally, the service provider server 140 and/or the payment provider server 160 may determine a user history, purchase history, user preferences, and/or other user information corresponding to user 102 from a user identifier transmitted to service provider server 140 during the check-in process. Thus, the information may be transmitted to user 102 based on the user history and/or the other user information. When a user 102 is checked-in with service provider server 140 and/or payment provider server 160, service provider server 140 and/or payment provider 160 may have an identifier of user device 110 and transmit the information to user device 110 using that identifier over network 170 and/or through one or more beacons 132.

Check-in application 112 may utilize communication module 118 to pass user information to service provider server 140 and/or payment provider 160, including user preferences, user calendar information, user relationship information, user email information, user social media information, user group membership information, user family information, user team information, identifiers of user 102 and/or user device 110, a request for assistance, a request for a type of assistance, product preference information, service preference information, etc.

Service application 120 may be used, for example, to provide a convenient interface to permit user 102 to receive, request, and/or view information, products and/or services. Service application 120 may correspond to an application specific to service location 130 and/or service provider server 140, such as an application downloadable over network 170 and/or through beacon 132. However, in other embodiments, service application 120 may correspond more generally to any application configured to receive information, targeted assistance, status updates, incentive offers, product offers, and/or service offers, including a browser application.

In various embodiments, check-in application 112 and service application 120 may be incorporated in the same application so as to provide their respective features in one convenient application interface.

User device 110 may include other applications 114 as may be desired in particular embodiments to provide features to user device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. In various embodiments, other applications 114 may include financial applications, such as banking, online payments, money transfer, mobile wallet, payment method selection, and/or other applications. Other applications 114 may include browser and/or mapping applications where the functions are not provided by check-in application 112 and/or service application 120. Other applications 114 may contain software programs, executable by a processor, including a graphical user interface (GUI) configured to provide an interface to the user.

User device 110 may further include memory such as database 116 which may include, for example, identifiers such as operating system registry entries, cookies associated with check-in application 112, service application 120, and/or other applications 114, identifiers associated with hardware of user device 110, or other appropriate identifiers, such as identifiers used for payment/user/device authentication or identification. Database 116 may include user device tokens and/or encryption keys, including a public key of service location 130 and/or service provider server 140 for beacon 132. Database 116 may include identifying information for tokens enabling check-in application 112 to identify beacon 132 when receiving a corresponding token. In one embodiment, identifiers in database 116 may be used to associate user device 110 with a particular account maintained by the account provider. Database 116 may further include online account access information and/or shopping list information.

Each user device 110 may include a communication module 118 adapted to communicate with beacon 132, service provider server 140, and/or payment provider server 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, BLE, WiFi, cellular, UPS, combined cellular and GPS, microwave, near field communication devices, and/or a combination thereof. Communication module 118 may communicate directly with beacon 132 without network 170 using short range wireless communications.

Beacon 132 may check-in each user when the user device 110 of that user is in proximity to beacon 132. Thus, beacon 132 may enable service provider server 140 and/or payment provider server 160 to associate a particular user 102 with service location 130 and/or a location within service location 130. Service location 130 may include a beacon 132 and a communication module 134. In other embodiments, service location 130 may include additional or different software and devices as required.

Beacon 132 may be maintained, for example, by service location 130 and service provider server 140 and/or one or more of payment provider servers 160. Beacon 132 may be implemented using any appropriate hardware and software configured for wireless communication with user device 110. For example, in one embodiment, beacon 132 may be implemented as a dongle device including a hardware processor and a communication module, for example, connected to device at service location 130. Thus, beacon 132 may be implemented as a device incorporated within or attached to a personal computer (PC), a smart phone, personal digital assistant (PDA), laptop computer, and/or other types of computing devices capable of transmitting and/or receiving data, such as an IPAD® from APPLE®. Beacon 132 may also act as a stand-alone device including a processor, communication module, and/or network interface component configured to communicate with user device 110 and/or service provider server 140, such as another smart phone communicating through LTE Direct. Although a single beacon is described, a plurality of beacons may be utilized and be location specific within service location 130, as previous discussed.

Beacon 132 of FIG. 1 may include processes, procedures, and/or applications executable by a hardware processor, for example, a software program, configured to interact with user devices 110. Beacon 132 may include applications for transmitting requests to establish a connection between a user device and beacon 132. Thus, beacon 132 may utilize a low energy short range wireless communication of beacon 132 to transmit requests to establish a connection with user devices 110, including an identifier such as a Universally Unique Identifier (UUID). If user devices 110 receive a request to establish the connection with beacon 132 and respond with a user device identifier (potentially including the UUID and other information to effectuate a check-in of each user device 110), beacon 132 may ramp up in power and create a connection between user devices 110 and beacon 132.

Beacon 132 may transmit the request to establish the connection with beacon 132 as a short range communication (e.g. a BLE protocol communication) including a "wake up" process for check-in applications 112 of user devices 110 and/or a token for beacon 132 or service provider server 140. In other embodiments, the request and/or connection may utilize near field communication, radio communication, infrared communication, or Bluetooth communication, BLE communication, WiFi communication, cellular communication, GPS communication, microwave communication, and/or any suitable combination thereof. The request may be specific to each user device 110 by including information that is specific to the corresponding user 102, such as a name, identifier, or user device identifier. The information specific to user 102 may be determined from user accounts of user 102 or other information previously provided to service provider server 140. Thus, in certain embodiments, only one or more specific user devices 110 will pick up and authenticate the request.

After beacon 132 receives user device identifier from user device 110 of user 102, beacon 132 may determine that user 102 is at or in proximity to service location 130. Beacon 132 may pass the user device identifier to service provider server 140 and/or one or more of payment provider servers 160 to complete the check-in process and associate user 102 with service location 130. As shown in FIG. 1, beacon 132 utilizes communication module 134 to pass the information to service provider server 140 and/or one or more of payment provider servers 160. However, in other embodiments, beacon 132 may utilize a network connection of beacon 132 through a communication module of beacon 132. Additionally, beacon 132 may keep a communication channel open between user device 110 and service provider server 140 and/or one or more of payment provider servers 160 for passing information to and from user device 110.

In various embodiments, service location 130 includes at least one communication module 134 adapted to communicate with user devices 110, service provider server 140, and/or one or more of payment provider servers 160. Communication module 134 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, BLE, cellular, GPS, combined cellular and GPS, microwave, near field communication devices, and/or any combination thereof. Communication module 134 may communicate directly with user device 110 without network 170 using short range wireless communications.

Service provider server 140 may be maintained, for example, by a service location including one or a plurality of service locations. Generally, service provider server 140 may be maintained by anyone or any entity that establishes and/or maintains a location with services and/or products offered to users. In this regard, service provider server 140 may include one or more applications, which may be configured to interact with user devices 110 and/or service location 130 to complete check-in processes for user devices 110. Although only one service provider server is shown, a plurality of service provider servers may be utilized. In various embodiments, the check-in and assistance features of service provider server 140 may also be offered by one or more of payment provider servers 160. Thus, all or part of the described features and processes of service provider server 140 may be incorporated within one or more of payment provider servers 160.

Service provider server 140 may include a check-in application 142, a service provider application 150, a database 146, and a network interface component 148. Check-in application 142 and service provider application 150 may correspond to processes, procedures, and/or applications executable by a hardware processor, for example, a software program. In other embodiments, service provider server 140 may include additional or different software as required.

Check-in application 142 may correspond to processes to complete check-in with user device 110. Thus, check-in application 142 may correspond to the server side application of service provider server 140 configured to transmit and/or receive check-in requests from user device 110 and complete the check-in requests. A check-in request may include log-in information for a user account in database 146. Check-in may be completed by verifying the account information. However, in embodiments where a user account has not been previously established by user 102, check-in application 142 may receive other information for identifying user 102, such as user names/identifiers, user device identifiers, group identifiers, an identifier for an account with another server (e.g., a payment account/payment account identifier with payment provider server 160), or other information.

Additionally, check-in application 142 may check user 102 out of the location when user 102 leaves the proximity of beacon 132. Checking user 102 out of a location may include checking the user out of the location corresponding to a particular beacon 132.

Service provider server 140 may include service provider application 150 configured to receive information corresponding to user 102 (e.g., a user identifier and/or other user information) that is checked-in to beacon 132 through service location 130 and provide information such as a merchant identifier, a merchant location, and/or product offers and/or service offers to user 102.

Check-in information may correspond to one or more user accounts of user 102 with another server, such as one or more of payment provider servers 160. In such embodiments, service provider server 140 may determine user information such as a user history and/or user preferences from information received from a payment provider server 160. Payment provider server(s) 160 may provide information about previous purchases/visits by user 102 at the same or similar locations to service location 130 or may provide other information.

In various embodiments, service provider server 140 may include other applications 144 as may be desired in particular embodiments to provide features to service provider server 140. For example, other applications 144 may include security applications for implementing server-side security features, programmatic server applications for interfacing with appropriate application programming interfaces (APIs) over network 170, or other types of applications. Other applications 144 may contain software programs, executable by a processor, including a graphical user interface (GUI), configured to provide an interface to a user.

Service provider server 140 may include a database 146 which may include, for example, identifiers such as operating system registry entries, cookies associated with check-in application 142 and/or service provider application 150, identifiers associated with hardware of service provider server 140, or other appropriate identifiers, such as identifiers used for payment/user/device authentication or identification. Database 146 may include identifiers and/or user accounts of user 102, which may comprise an identifier for users 102 and/or user devices 110. In various embodiments, identifiers in database 146 may be used by a payment/credit provider, such as payment provider server 160, to associate user 102 with a particular account maintained by a payment provider server 160. For example, an identifier for a payment account with a payment provider server 160 may be stored with a user account and/or identifiers of users 102 in database 146. In other embodiments, a user account stored in database 146 may include a shared identifier with the payment account with a payment provider server 160.

In various embodiments, service provider server 140 includes at least one network interface component 148 adapted to communicate with user devices 110, service location 130, and/or payment provider servers 160 over network 170. In various embodiments, network interface component 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, BLE, cellular, GPS, combined cellular and GPS, microwave, near field communication devices, and/or any combination thereof.

Payment provider servers 160 may include a payment provider server maintained, for example, by an online payment service provider, which may provide user account and payment services on behalf of user 102 and other users. In this regard, a payment provider server 160 includes one or more processing applications, which may provide payment for items using a user account with that payment provider server 160. In one example, one or more of payment provider servers 160 may be provided by PAYPAL®, Inc. of San Jose, Calif., USA. Other payment provider servers 160 may be maintained by or include a merchant, financial services provider, credit card provider, bank, and/or other payment provider, which may provide user account services and/or payment services to user 102. Although payment provider servers 160 are described as separate from service provider server 140, it is understood that one or more of payment provider servers 160 may include services offered by service provider server 140 and vice versa.

Each payment provider server 160 may include a transaction processing application 162, a database of user accounts 164, and a network interface component 166. Transaction processing application 162 may correspond to processes, procedures, and/or applications executable by a hardware processor, for example, a software program. In other embodiments, payment provider server 160 may include additional or different software as required.

Transaction processing application 162 may be configured to receive information from one or more user devices 110 and/or service provider server 140 for processing and completion of financial transactions. Transaction processing application 162 may include one or more applications to process financial transactions between user devices 110 and/or service provider server 140. Financial transactions may include financial information corresponding to user debit/credit card information, checking account information, a user account (e.g., payment account with a payment provider server 160), or other payment information. Transaction processing application 162 may complete the financial transaction for the purchase request by providing payment to service provider server 140. In various embodiments, transaction processing application 162 may provide transaction histories, including receipts, to user device 110 in order to provide proof of purchase for an item and/or service. Transaction processing application 162 may also provide the transaction histories to service location 130 for use in pick-up/delivery of the item and/or service.

Additionally, a payment provider server 160 includes user accounts 164. As previously discussed, user 102 may establish one or more user accounts with a payment provider server 160. User accounts 164 may include user information, such as name, address, birthdate, payment/funding information, travel information, additional user financial information, and/or other desired user data.

In various embodiments, each payment provider server 160 may include at least one network interface component 166 adapted to communicate with user device 110, service location 130, and/or service provider server 140 over network 170. In various embodiments, network interface component 166 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), infrared (IR), BLE, cellular, GPS, combined cellular and GPS, microwave, and/or near field communication devices, and/or any combination thereof.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
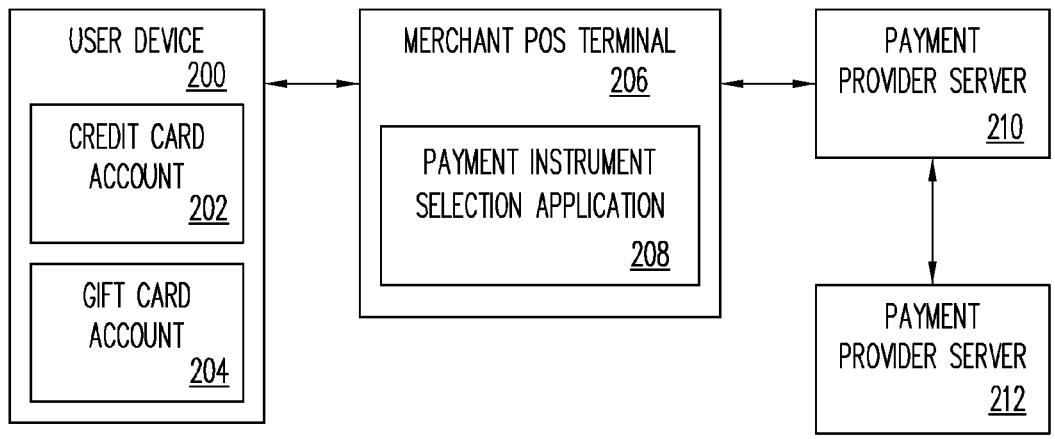
FIG. 2 is a diagram of a conventional payment system.

FIG. 2 is a diagram of a conventional payment system for processing payments for a user by selecting, for the user and during the payment operation, a payment instrument from a selection of available payment instruments. As shown in FIG. 2, in a conventional system, when a user device 200 is tapped at a merchant PUS terminal 206, a set of available payment instruments such as a credit card account 202 and a gift card account 204 are provided to the merchant POS terminal 206. The merchant POS terminal includes a payment instrument selection application 208 that selects one of the payment instruments for the user. In most conventional systems, the selected payment instrument is the first instrument in the list or the first valid instrument in the list. In other conventional systems, the selected payment instrument is selected by communicating with a payment provider server 210 to determine which of several funding sources stored by the payment provider server 210 provides a maximum benefit to the user. The payment provider server 210 then funds the payment either by transferring funds from an account of the user at payment provider server 210 or by interacting separately with an additional payment provider server 212 such as a credit card server or bank server at which the user has an account. However, these operations typically take place during the payment operations, which, if care is not taken, can affect the payment process and can be dependent upon interaction with the particular payment provider server 210 for successful selection of a payment instrument that benefits the user.

Figure 3:
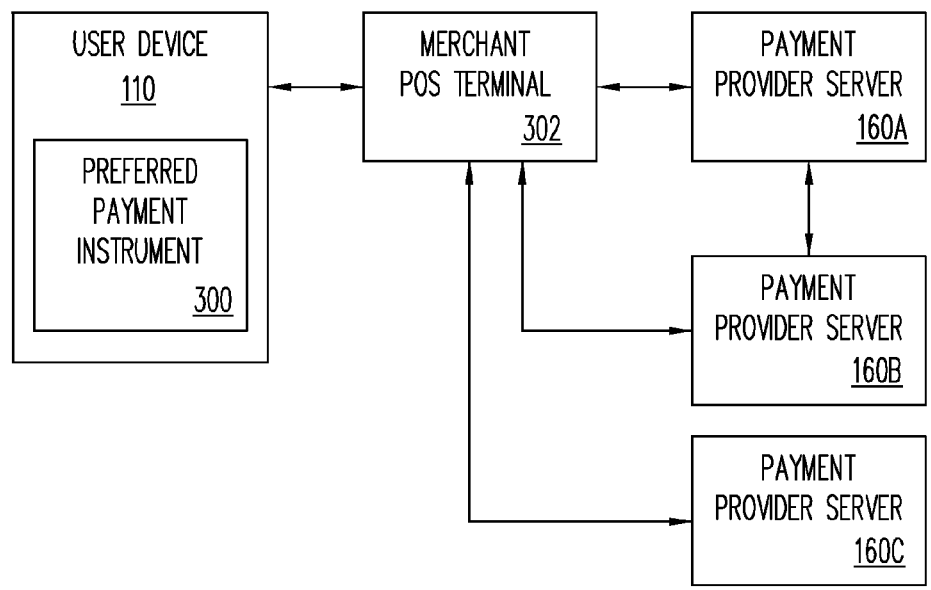
FIG. 3 is a block diagram of an illustrative networked system during a payment operation using a preferred payment instrument, according to an embodiment.

In contrast, FIG. 3 shows a portion of a payment system according to an embodiment of the invention in which, a preferred payment instrument 300 that is preferred for the user is the only instrument provided by user device 110 when user device 110 is in communication with merchant POS terminal 302 (e.g., a bar code scanner, NFC terminal, or other payment terminal). Merchant POS terminal 302 can then process the payment for the user using the preferred payment instrument by communicating directly with any payment provider server (e.g., any of payment provider servers 160A, 160B, and/or 160C of FIG. 3) associated with that payment instrument and while allowing, but not requiring, communication between payment provider servers 160.

For example, a user may walk into a Target® store and, upon entering the store, receive at a mobile device of the user (e.g., from a beacon), information indicating the user is at the Target® store. While the user shops for items, the user device 110 can determine a preferred payment instrument to be used at Target® and be configured to provide that preferred payment instrument as shown at the time of checkout. As examples, the preferred payment instrument may be a Target® gift card, a credit card with bonus rewards for using the card at Target®, a credit card or debit card with airline rewards that the user is currently attempting to accumulate, or any other payment instrument that provides the user with benefits that are greater than the benefits of other payment instruments.

Figure 4:
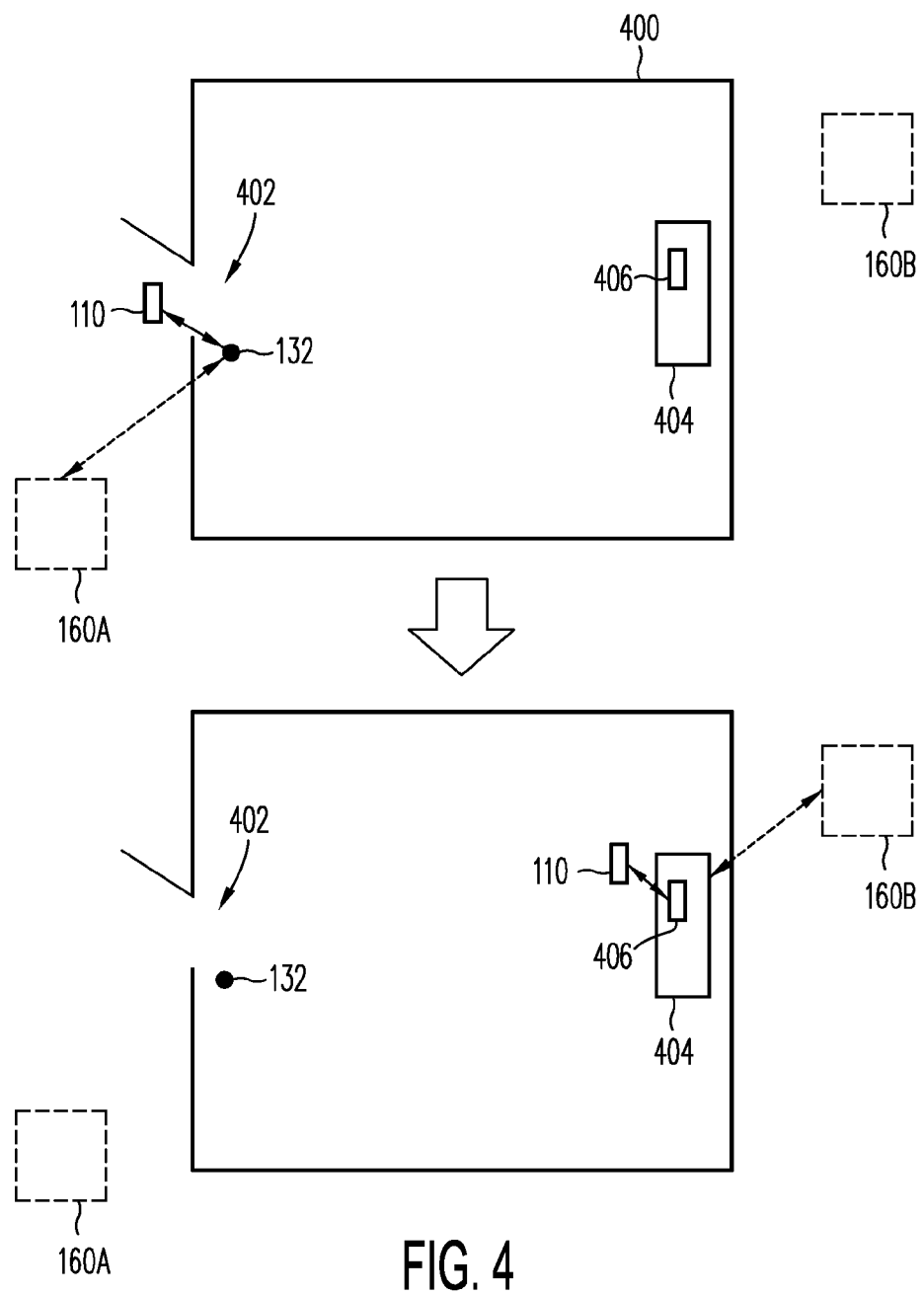
FIG. 4 shows diagrams of an illustrative merchant location having a beacon and a point of sale device during check-in of the user and during a payment operation, according to an embodiment.

FIG. 4 is a diagram showing how communications between a user device 110, a beacon 132, and a POS device 406 can be exchanged at various times during a user's shopping experience at a merchant 400 to perform preferred payments for the user, according to an embodiment. As shown in the top diagram of FIG. 4, a merchant location 400 may include an entrance 402 at which one or more beacons such as beacon 132 are located. When a user carries a user device such as user device 110 through the entrance 402, user device 110 and beacon 132 may exchange information as, for example, described herein. For example, user device 110 may receive location information from beacon 132 using BLE communications when user device 110 is within the proximity (e.g., within 10 feet, within 10 meters, within 5 feet, within 100 feet, within 1 meter, or within 1 foot) of beacon 132. While user device 110 and beacon 132 are in communication, user device 110 may be checked into the merchant location 400.

As shown in the top diagram of FIG. 4, beacon 132 may also be in communication with a first payment provider server such as payment provider server 160A. Payment provider server 160A and/or user device 110 may include memory that stores a user account of the user of user device 110. The user account may include one or more payment instruments that can be used for making payments with user device 110.

When user device 110 receives the location information from beacon 132, user device 110 can determine, using stored payment instrument information on the user device, which of several payment instruments will provide the greatest benefit (e.g., cash rewards benefit, discount benefit, points benefit, interest rate benefit, or other financial benefit) if used at the merchant location 400. The payment instrument that is determined to provide the greatest benefit may be selected as a preferred payment instrument while the user is at merchant location 400. User device 110 (e.g., a wallet application of user device 110) may then be configured to present only the preferred payment instrument when a payment instrument is requested from the user device during a payment operation. In this way, user device 110 may prepare itself in advance for upcoming payment operations at merchant location 400.

Payment provider server 160A (e.g., a PAYPAL® server) may also be used to determine the preferred payment instrument and to configure user device 110 to provide only the preferred payment instrument when a payment instrument is requested from the user device during a payment operation. For example, payment provider server 160A may include a user account associated with the user of user device 110 that includes one or more possible payment instruments of the user, user preferences, and/or other information such as temporary incentives associated with a particular payment instrument or other information that is not known by user device 110. Payment provider server 160A may receive a user identifier from user device 110 through beacon 132 and, upon receiving the user identifier and checking in the user, determine for the user, a preferred payment instrument.

In one exemplary scenario, a user may have first and second credit cards registered with payment provider server 160 to be used in mobile wallet transactions for the user. The first credit card may have a cash back rewards system that will provide the user with 5% cash back for purchases at merchant location 400 compared with 3% cash back from the second credit card. However, payment provider server 160 may determine (e.g., based on stored information at payment provider server 160 and/or by accessing one or more other payment provider servers) that the second credit card is offering a 10% cash back reward for a limited time at the merchant and/or for particular products that the merchant sells. Payment provider server 160A may then select the second credit card as the preferred credit card if the user is at merchant location 400 during the limited time.

As shown in the bottom diagram of FIG. 4, when a user later moves to a point of sale 404 (e.g., a checkout register, a self-checkout stand, a merchant employee with a point of sale device, etc.) the user may tap, wave, present or otherwise initiate communications such as NFC communications between user device 110 and POS device 406. For example, after shopping at merchant location 400, a user may bring one or more items for purchase to a checkout stand and, once the items have been scanned or entered for purchase and the purchase price totaled, the user may make a payment using the communications between user device 110 and POS device 406. At the time that the user initiates the communications between user device 110 and POS device 406, user device 110 may already have been configured to provide a preferred payment instrument for that merchant location 400 to POS device 406 when payment instruments are requested by POS device 406. In this way, any decision making functionality of the POS device 406 can be prevented from affecting the use of the user's preferred payment instrument.

As shown in the bottom diagram of FIG. 4, POS device 406 may be in communication with a payment provider server 160B. According to various embodiments, payment provider server 160B may be the same payment provider server as payment provider server 160A (e.g., if the preferred payment instrument is a payment instrument of payment provider server 160A) or a different payment provider server (e.g., if the preferred payment instrument is a payment instrument of another payment provider server). In one exemplary scenario, a user may have a Visa® credit card and a PayPal® payment account available for use for payments with a mobile wallet application. With or without participation from the PayPal® server, user device 110 may be configured to present only a preferred payment instrument for payment operations at merchant 400 based on communications with beacon 132. In scenarios in which the Visa® credit card is the preferred payment instrument, during payment operations using POS device 406, no communication with the PayPal® server may be required (although in some embodiments, the Visa® credit card may be accessed via the PAYPAL® server). In scenarios in which the PayPal® payment account is the preferred payment instrument, the PayPal® server may interact with user device 110 both for configuration operations during communication through beacon 132 and for payment operations during communication with POS device 406.

There are therefore several scenarios in which user device can be configured for and used to perform payments at a merchant using a preferred payment instrument. In one scenario, the user device may receive location information from a beacon at the merchant, determine a preferred payment instrument using the location information, self configure to present the preferred payment instrument, and provide the preferred payment instrument to a POS device that communicates with a payment provider server associated with the preferred payment instrument to complete the payment.

In another scenario, the user device may receive location information from a beacon at the merchant and provide identifying information to a payment provider server through the beacon, determine, in cooperation with the payment provider server, a preferred payment instrument associated with the same payment provider server, self configure or be configured by the payment provider server to present the preferred payment instrument, and provide the preferred payment instrument to a POS device that communicates with the same payment provider server associated with the preferred payment instrument to complete the payment.

In another scenario, the user device may receive location information from a beacon at the merchant and provide identifying information to a payment provider server through the beacon, determine, in cooperation with the payment provider server, a preferred payment instrument associated with a different payment provider server, self configure or be configured by the payment provider server to present the preferred payment instrument, and provide the preferred payment instrument to a POS device that communicates with the different payment provider server associated with the preferred payment instrument to complete the payment.

Figure 5:
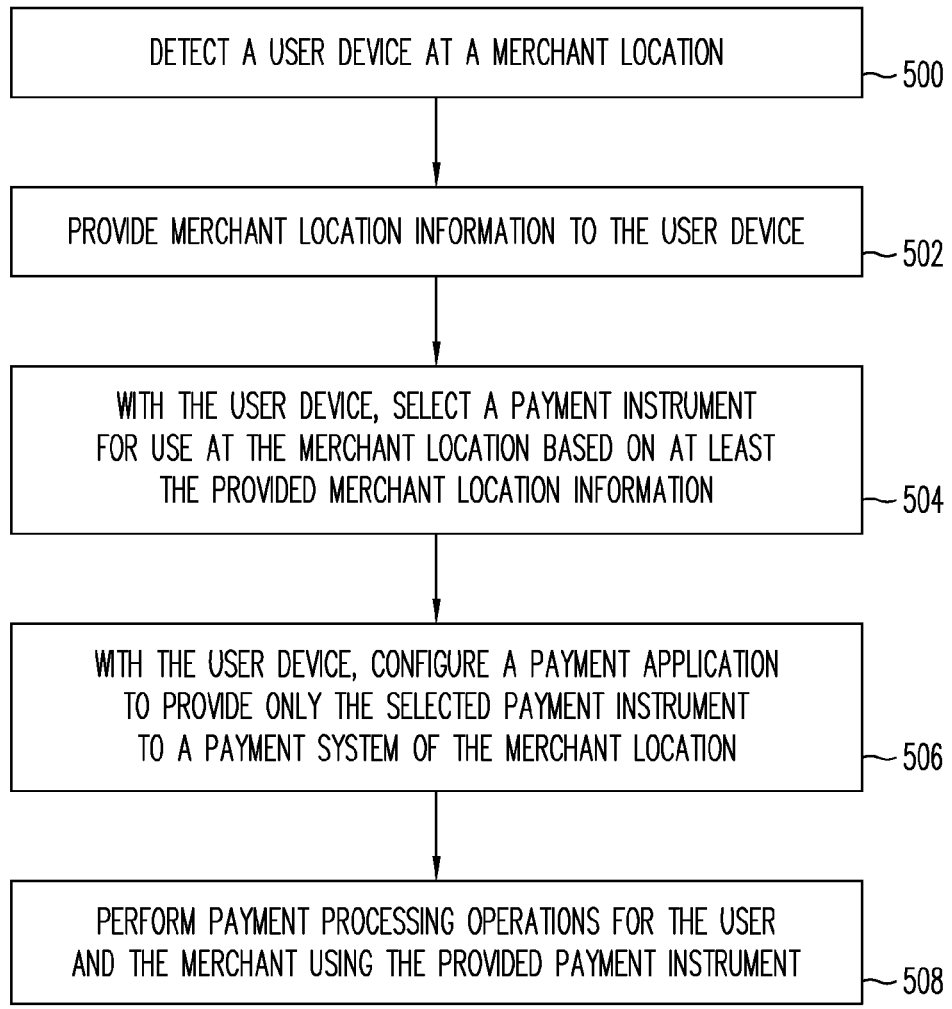
FIG. 5 is a flowchart of an exemplary process for providing a user at a merchant with the ability make purchases using a preferred payment instrument, according to an embodiment.

Illustrative steps that may be performed for processing payments at a merchant using a preferred payment instrument determined using at least one beacon are shown in FIG. 5.

At step 500, a user device may be detected at a merchant location. The user device may be detected at the merchant location when the user device and a beacon at the merchant location establish a wireless connection as described herein.

At step 502, merchant information such as merchant location information may be provided to the user device that informs the user device that the user device is located at a particular location (e.g., at a particular merchant or merchant chain). The merchant information may also include information informing the user device that the merchant is a particular type of merchant, a particular class of merchant, a merchant that sells a particular type of product or executes a particular type of transaction, etc. For example, a beacon may provide merchant information that advertises that a merchant is named "Joe's Travel Shop", and may indicate that Joe's Travel Shop is, as examples, a luggage sales store or a travel agent.

At step 504, with the user device, one or more payment instruments may be selected for use at the merchant location based on at least the provided merchant location information. The selected payment instrument may be a preferred payment instrument or a plurality of preferred payment instruments provided in a ranked or dynamically ordered list of payment instruments for the user at the merchant location as described herein. In the example in which a beacon provides a user device with merchant information indicating that the merchant is named Joe's Travel Shop and is a travel agent, one or more travel-related payment instruments may be selected as preferred payment instruments (e.g., a JetBlue® American Express® card or a United Airlines® Visa® card).

In some circumstances, it may be determined that one of the travel-related payment instruments is more beneficial to the user for purchases at Joe's Travel Shop than another and that payment instrument may be selected as the preferred payment instrument. In other circumstances, it may not be possible to determine between the plurality of preferred travel-related payment instruments, which is the most beneficial for purchases at Joe's Travel Shop and a list of the preferred travel-related payment instruments may be selected (e.g., a list including both the JetBlue® American Express® card and the United Airlines® Visa® card).

At step 506, with the user device, the user device (e.g., a payment application on the user device) may be configured to provide only the selected payment instrument (e.g., the JetBlue® American Express® card or the United Airlines® Visa® card) to a payment system of the merchant location (e.g., when payment instruments are requested from the user device by the payment system of the merchant location). However, this is merely illustrative. If desired, the preferred payment instrument may be provided as a first payment instrument in a list of preferred payment instruments (e.g., a list including both the JetBlue® American Express® card and the United Airlines® Visa® card). The list may be provided in an order of preference for the user or, in a case in which no determination of a preference between multiple preferred payment instruments can be determined from the merchant information, the list may include a plurality of preferred payment instruments for that merchant in a random or other order.

At step 508, payment processing operations may be performed for the user and the merchant using the provided payment instrument. For example, the user may tap the user device that has been previously configured to provide the preferred payment instrument against an NFC point of sale device, thereby authorizing the NFC point of sale device to request payment from a payment provider server associated with the preferred payment instrument. In circumstances in which the provided payment instrument is a list such as a dynamically ordered and/or ranked list of preferred payment instruments, a point of sale device may select one of the preferred payment instruments from the list for processing of the payment.

Figure 6:
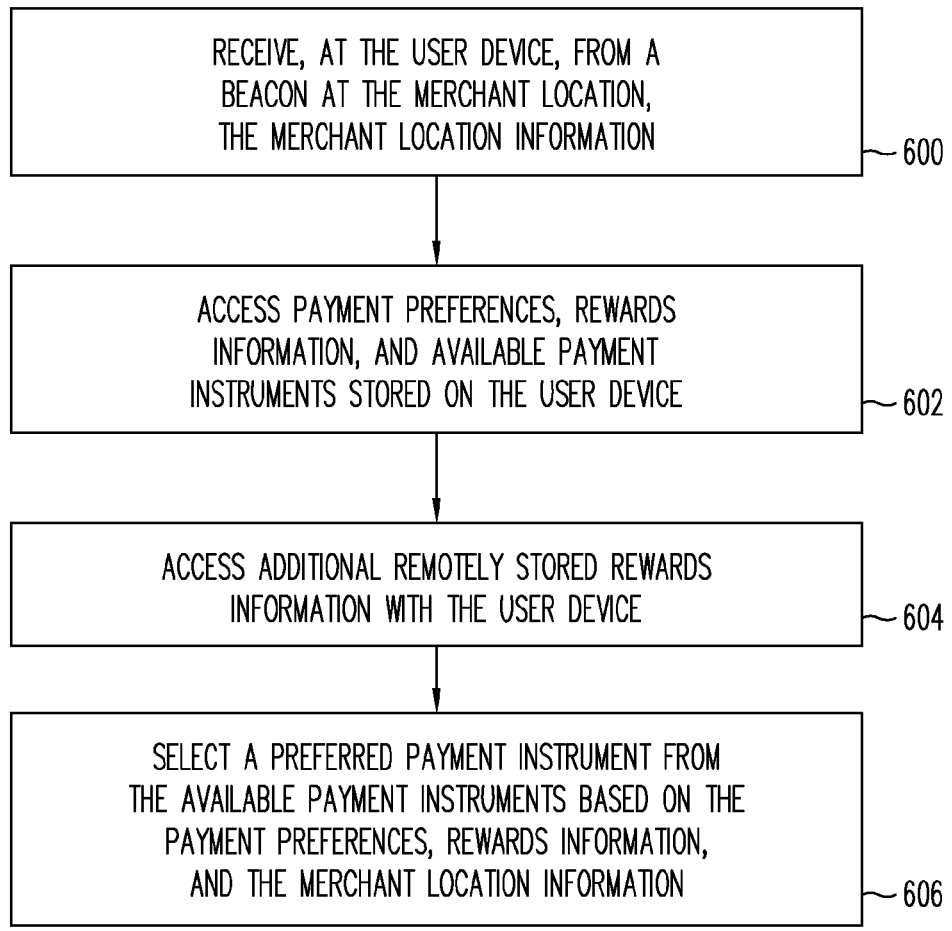
FIG. 6 is a flowchart of an exemplary process showing further details of operations that may be performed for selecting a preferred payment instrument with a user device based on a provided merchant location, according to an embodiment.

Illustrative operations that may be performed for selecting a payment instrument for use at the merchant location based on at least the provided merchant location information as described above in connection with step 504 are shown in FIG. 6.

At step 600, the user device may receive, from a beacon at the merchant location, the merchant information (e.g., merchant location information and/or other merchant information) described above in connection with step 502.

At step 602, the user device (e.g., a payment or wallet application on the user device) may access information such as payment preferences, rewards information, and available payment instruments stored on the user device. The rewards information may include information associated with each available payment instrument such as an interest rate, a cash back rate, a points rate, an airline miles rewards rate, merchant-specific rewards, and/or other rewards and/or financial benefit and/or penalty information for that payment instrument. Payment preferences may include user-provided preferences for particular payment instruments at particular times and/or particular locations, a preference to primarily use one particular payment instrument until sufficient rewards points are accumulated for a user goal, and/or preferences for limiting use of one or more payment instruments to a maximum monthly amount, yearly amount, daily amount, or transaction amount (as examples).

At step 604, the user device may optionally access additional rewards information that is stored remotely from the user device (e.g., at one or more payment provider servers). The additional rewards information may include time-limited rewards for one or more particular payment instruments such as a special offer reward rate on a particular day and/or at a particular merchant.

At step 606, one or more preferred payment instruments may be selected from the available payment instruments based on the payment preferences, the rewards information, and/or the merchant location information. The preferred payment instrument(s) may be selected by aggregating and/or comparing the accessed rewards information for each available payment instrument and selecting the payment instrument with the highest aggregated awards. During the comparison, the user preferences may be used to weight and/or eliminate some rewards and/or some payment instruments. For example, a user may set a particular payment instrument as a default preferred instrument. That payment instrument may be weighted more heavily than other payment instruments during a rewards comparison, or that payment instrument may be selected when the rewards benefits of other payment instruments are substantially the same.

Figure 7:
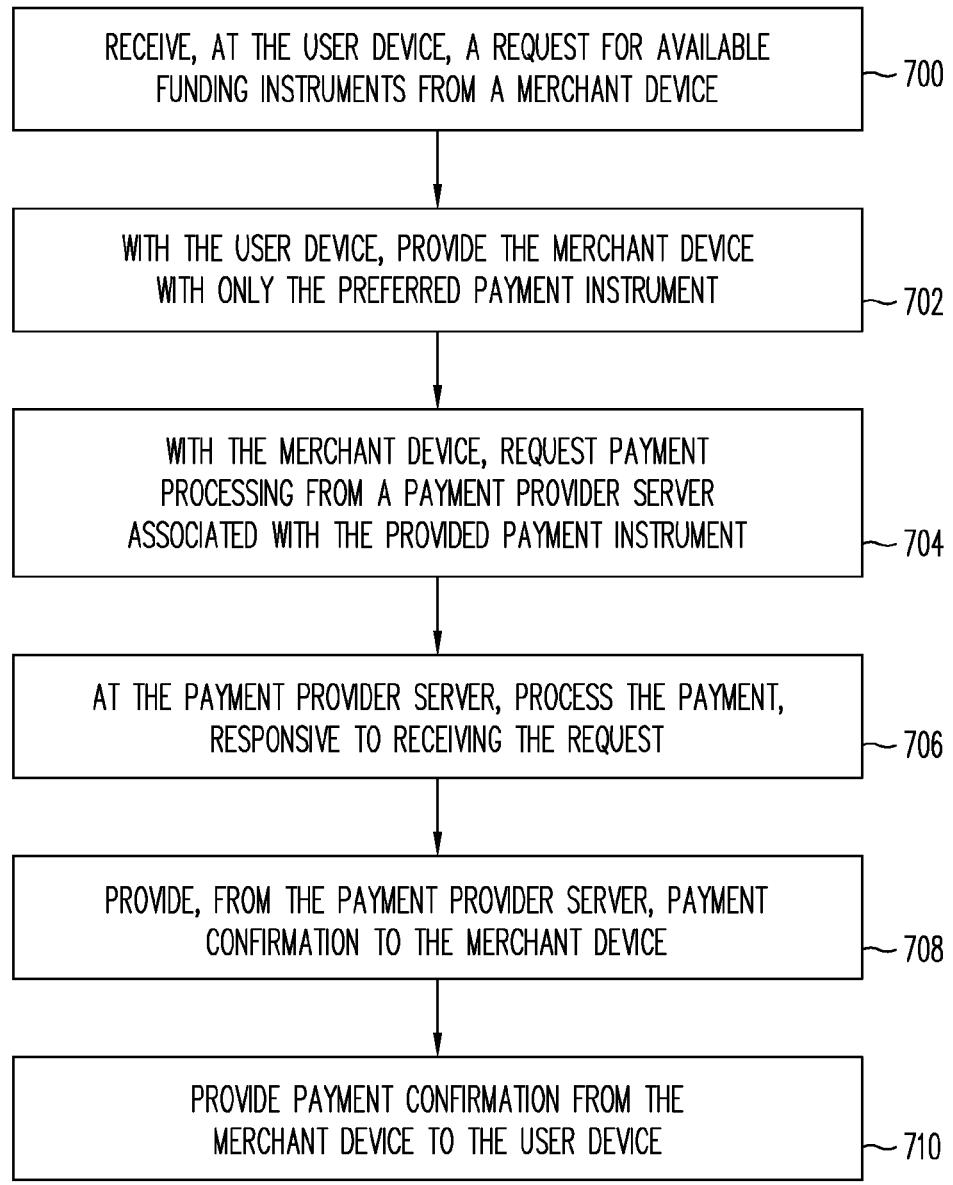
FIG. 7 is a flowchart of an exemplary process showing further details of operations that may be performed for performing payment processing operations using a preferred payment instrument, according to an embodiment.

Illustrative operations that may be performed for performing payment processing operations for the user and the merchant using the provided payment instrument as described above in connection with step 508 are shown in FIG. 7.

At step 700, the user device may receive, from a merchant device such as POS device, a request for available funding instruments. The request may be received when the user device and the POS device establish communications when the user device is tapped, waved, or otherwise presented in the vicinity of the POS device via, for example NFC communications between the user device and the POS device.

At step 702, with the user device, the merchant device may be provided with only the preferred payment instrument or a list of preferred payment instruments for use in processing the payment.

At step 704, the merchant device (e.g., the POS device) may request payment processing from a payment provider server associated with the provided payment instrument or a selected one of the preferred payment instruments in the list of preferred payment instruments. For example, if the preferred payment instrument is a MasterCard® credit card, the merchant device may request payment processing from a MasterCard® server using the customers MasterCard® credit card information (e.g., name, address, credit card number, expiration data, security information, etc.) as provided by the user device as the provided preferred payment instrument.

At step 706, the payment provider server may process the payment responsive to receiving the request. Processing the payment may include transferring funds to the merchant and debiting or crediting an account of the user correspondingly.

At step 708, the payment provider server may provide confirmation to the merchant device that the payment was processed.

At step 710, the merchant device may provide a payment confirmation to the user device that the payment was processed. The payment confirmation may be provided to the user device in the form of an electronic receipt and may be provided, for example, via near field communications with the user device. Additional details of payment processing operations using a POS device in communication with a user's mobile device are described in U.S. patent application Ser. No. 13/330,264 which is incorporated herein by reference in its entirety.

Figure 8:
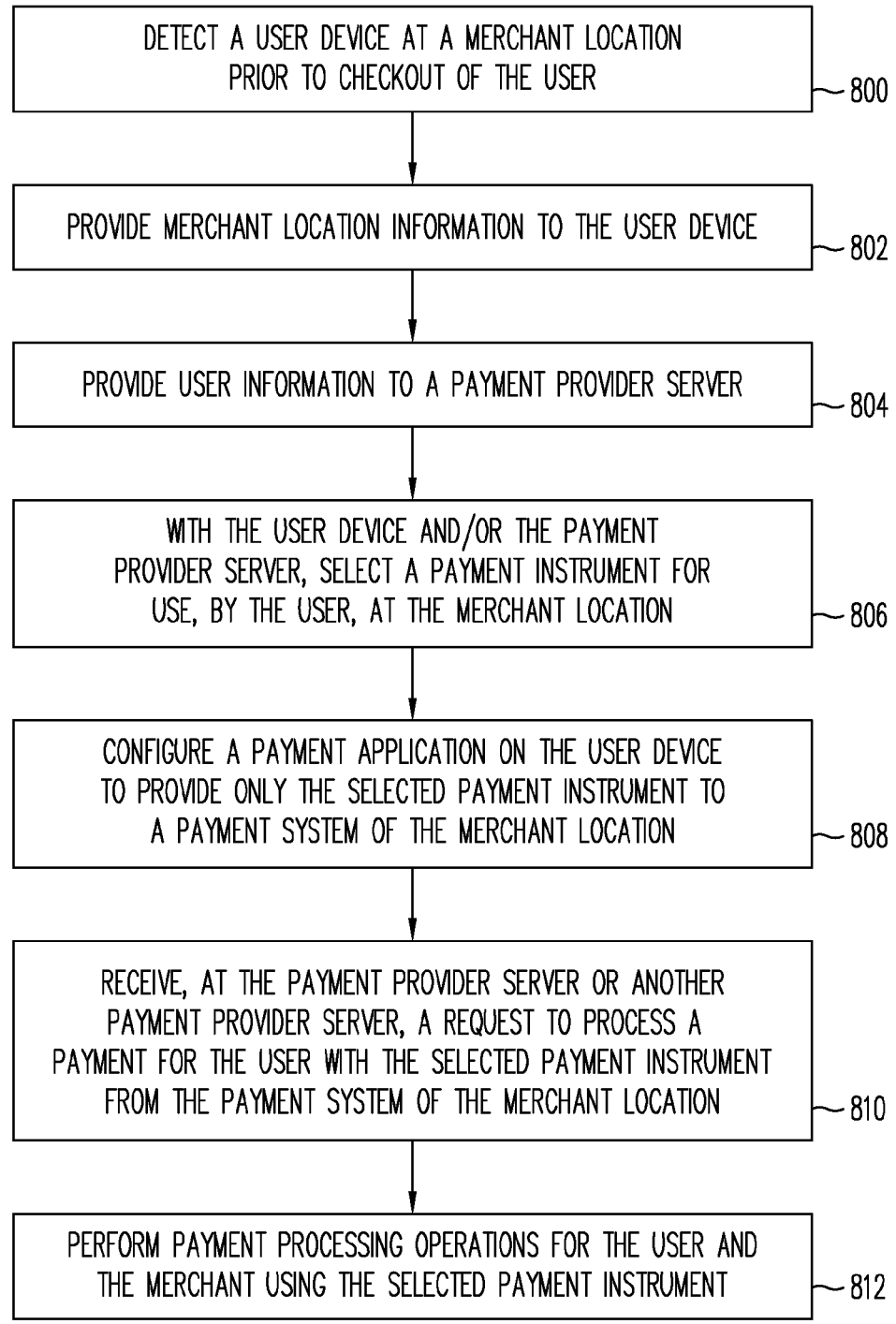
FIG. 8 is a flowchart of another exemplary process for providing a user at a merchant with the ability make purchases using a preferred payment instrument, according to an embodiment.

As described herein, in some situations, a payment provider server may also determine, alone or in cooperation with a user device, a preferred payment instrument for a user at a merchant location. Illustrative steps that may be performed for processing payments at a merchant using a preferred payment instrument determined using at least one beacon and at least in cooperation with a payment provider server are shown in FIG. 8.

At step 800, a user device may be detected at a merchant location. The user device may be detected at the merchant location when the user device and a beacon at the merchant location establish a wireless connection and prior to checkout of the user (e.g., when the user arrives at the merchant location and/or while the user is shopping at the merchant location).

At step 802, merchant location information may be provided to the user device that informs the user device that the user device is located at a particular location (e.g., at a particular merchant or merchant chain). If desired, additional merchant information may also be provided.

At step 804, user information such as a user identifier, a user device identifier, a user name, a user account number, or other identifying information of the user may be provided to a payment provider server (e.g., by providing the information from the user device to the beacon in communication with the payment provider server).

At step 806, with the user device and/or the payment provider server, a payment instrument may be selected for use at the merchant location based on at least the provided merchant location information. The selected payment instrument may be a preferred payment instrument for the user at the merchant location as described herein. Selecting the payment instrument may include, for example, any of the operations described above in connection with steps 600-606 of FIG. 6 with the operations being performed entirely by the payment provider server or cooperatively by the payment provider server and the user device. In embodiments in which the payment instrument is selected by the payment provider server, the payment provider server may provide the preferred payment instrument, when selected, to the user device. The user may also be notified of the selected payment instrument and provided with an option to confirm, change, and/or cancel the selection of the preferred payment instrument. In embodiments, in which the user device and the payment provider server cooperatively select the payment instrument, the preferred payment instrument may be ultimately determined by the payment provider server (and provided to the user device) or the user device may ultimately determine the preferred payment instrument using additional provided information such as time limited rewards information received from the payment provider server.

At step 808, the user device (e.g., a payment application on the user device) may be configured (e.g., by the user device itself or by the payment provider server) to provide only the selected payment instrument to a payment system of the merchant location (e.g., when payment instruments are requested from the user device by the payment system of the merchant location). However, this is merely illustrative. If desired, the preferred payment instrument may be provided as a first payment instrument in a ranked list of preferred payment instruments or a list of equally preferred payment instruments may be provided.

At step 810, the payment provider server or another payment provider server may receive a request to process a payment for the user with the selected (preferred) payment instrument from the payment system of the merchant location. For example, the user may tap the user device that has been previously configured to provide the preferred payment instrument against an NFC point of sale device, thereby authorizing the NFC point of sale device to request payment from the payment provider server that is associated with the preferred payment instrument whether or not it is the same payment provider server with which the preferred payment instrument was selected.

At step 812, payment processing operations for the user and the merchant may be performed by the payment provider server that received the request using the provided payment instrument.

FIG. 9 is a block diagram of a computer system suitable for implementing one or more components in FIG. 1, according to an embodiment. In various embodiments, the user device may comprise a personal computing device (e.g., smart phone, a computing tablet, a personal computer, laptop, PDA, Bluetooth device, key FOB, badge, etc.) capable of communicating with the network. The merchant device and/or service provider may utilize a network computing device (e.g., a network server) capable of communicating with the network. It should be appreciated that each of the devices utilized by users and service providers may be implemented as computer system 900 in a manner as follows.

Computer system 900 includes a bus 902 or other communication mechanism for communicating information data, signals, and information between various components of computer system 900. Components include an input/output (I/O) component 904 that processes a user action, such as selecting keys from a keypad/keyboard, selecting one or more buttons, image, or links, and/or moving one or more images, etc., and sends a corresponding signal to bus 902. I/O component 904 may also include an output component, such as a display 911 and a cursor control 913 (such as a keyboard, keypad, mouse, etc.). An optional audio input/output component 905 may also be included to allow a user to use voice for inputting information by converting audio signals. Audio I/O component 905 may allow the user to hear audio. A transceiver or network interface 906 transmits and receives signals between computer system 900 and other devices, such as another user device, a merchant device, or a service provider server via network 170. In one embodiment, the transmission is wireless, although other transmission mediums and methods may also be suitable. One or more processors 912, which can be a micro-controller, digital signal processor (DSP), or other processing component, processes these various signals, such as for display on computer system 900 or transmission to other devices via a communication link 918. Processor(s) 912 may also control transmission of information, such as cookies or IP addresses, to other devices.

Components of computer system 900 also include a system memory component 914 (e.g., RAM), a static storage component 916 (e.g., ROM), and/or a disk drive 917. Computer system 900 performs specific operations by processor(s) 912 and other components by executing one or more sequences of instructions contained in system memory component 914. Logic may be encoded in a computer readable medium, which may refer to any medium that participates in providing instructions to processor(s) 912 for execution. Such a medium may take many forms, including but not limited to, non-volatile media, volatile media, and transmission media. In various embodiments, non-volatile media includes optical or magnetic disks, volatile media includes dynamic memory, such as system memory component 914, and transmission media includes coaxial cables, copper wire, and fiber optics, including wires that comprise bus 902. In one embodiment, the logic is encoded in non-transitory computer readable medium. A non-transitory computer-readable medium may include instructions which, in response to execution by a computer system, cause the computer system to perform some or all of one or more methods as described herein. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 900. In various other embodiments of the present disclosure, a plurality of computer systems 900 coupled by communication link 918 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Flaying thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
non-transitory memory storing instructions; and
one or more hardware processors configured to execute the instructions to cause the system to:
   receive, from a beacon at a merchant, merchant location information;
   access a plurality of payment instruments associated with a user of the system for making payments with the system;
   determine, based on the merchant location information and the merchant, a respective user benefit associated with each of the plurality of payment instruments when used at the merchant;
   determine, based on the user benefits, a preferred payment instrument from the plurality of payment instruments for processing a payment at the merchant, wherein the preferred payment instrument has a user benefit that is greater than the user benefits of other payment instruments from the plurality of payment instruments when used by the system for the payment at the merchant;
   receive, from a point of sale (PoS) device of the merchant, a request for available funding instruments for the payment; and
   provide the preferred payment instrument to the PoS device responsive to the request.

2. The system of claim 1, wherein the determining the respective user benefit comprises:
accessing a subset of the plurality of payment instruments associated with the user that are useable at the merchant at the merchant location; and
determining the respective user benefit for each of the subset of the plurality of payment instruments.

3. The system of claim 1, wherein the beacon comprises a wireless beacon located at or near an entrance to the merchant, and
   wherein the PoS device is a separate device from the beacon.

4. The system of claim 1, wherein the determining the preferred payment instrument is further based on whether the merchant at the merchant location offers a plurality of products associated with the respective user benefit, wherein the plurality of products are determined based on the merchant location information.

5. The system of claim 1, wherein executing the instructions further cause the system to configure the preferred payment instrument for the payment prior to receiving the request from the PoS device.

6. The system of claim 1, wherein the determining the preferred payment instrument comprises communicating with a payment provider server to cause the payment provider server to initiate use of the preferred payment instrument with the PoS device.

7. The system of claim 1, wherein the determining the preferred payment instrument comprises:
communicating the merchant location information to a payment provider server; and
receiving the preferred payment instrument from the payment provider server, wherein the preferred payment instrument indicates an additional payment provider server that is different from the payment provider server.

8. A method, comprising:
receiving, at a user device of a user and from a beacon at a merchant, merchant information and merchant location information;
accessing a plurality of payment instruments associated with a user of a user device for making payments with the user device;
determining, based on the merchant location information and the merchant, a respective user benefit associated with each of the plurality of payment instruments when used at the merchant;
determining, based on the user benefits, a preferred payment instrument from the plurality of payment instruments for processing a payment at the merchant, wherein the preferred payment instrument has a user benefit that is greater than the user benefits of other payment instruments from the plurality of payment instruments;
configuring the user device to provide the preferred payment instrument while the user device is at the merchant;
receiving a request from a point of sale (PoS) device of the merchant, for at least one payment instrument from the user device for the payment; and
providing the preferred payment instrument from the user device to the PoS device responsive to the request.

9. The method of claim 8, wherein the providing the preferred payment instrument comprises providing the preferred payment instrument without providing the other payment instruments.

10. The method of claim 8, wherein the providing the preferred payment instrument comprises providing the preferred payment instrument in a list of preferred payment instruments each determined based on the respective user benefits.

11. The method of claim 8, wherein the determining the respective user benefit comprises:
accessing a subset of the plurality of payment instruments associated with the user that are useable at the merchant at the merchant location; and
determining the respective user benefit for each of the subset of the plurality of payment instruments.

12. The method of claim 8, wherein the determining the preferred payment instrument is further based on whether the merchant at the merchant location offers a plurality of products associated with the respective user benefit, wherein the plurality of products are determined based on the merchant location information.

13. The method of claim 8, wherein the determining the preferred payment instrument comprises:
communicating the merchant location information and the merchant information to a first payment provider server, and
receiving the preferred payment instrument from the payment provider server, wherein the preferred payment instrument indicates a second payment provider server.

14. The method of claim 8, wherein the determining the preferred payment instrument comprises communicating with a payment provider server to cause the payment provider server to initiate use of the preferred payment instrument with the PoS device.

15. The method of claim 8,
wherein the beacon comprises a wireless beacon is located at or near an entrance of the merchant, and
wherein the PoS device is a separate device from the beacon.

16. The method of claim 8, wherein the configuring comprises configuring, prior to the requesting, the user device to provide the preferred payment instrument for the payment while the user device is operable to communicate with the beacon.

17. A non-transitory machine-readable medium having stored thereon machine-readable instructions executable to cause performance of operations comprising:
receiving, from a beacon at a merchant, merchant information and merchant location information;
accessing a plurality of payment instruments associated with a user of a mobile device for making payments with the mobile device;
determining, based on the merchant location information and the merchant, a respective user benefit associated with each of the plurality of payment instruments when used at the merchant;
determining, based on the user benefits, a preferred payment instrument from the plurality of payment instruments for processing a payment at the merchant, wherein the preferred payment instrument has a user benefit that is greater than the user benefits of other payment instruments from the plurality of payment instruments;
receiving a request for available funding instruments for the payment from a point of sale (PoS) device of the merchant following the determining the preferred payment instrument; and
providing the preferred payment instrument to the PoS device responsive to the receiving of the request.

18. The non-transitory machine-readable medium of claim 17, wherein the operations further comprise configuring the mobile device to provide the preferred payment instrument prior to the receiving of the request.

19. The non-transitory machine-readable medium of claim 17, wherein the determining the preferred payment instrument comprise:
communicating with a payment provider server to cause the payment provider server to initiate use of the preferred payment instrument with the PoS device.

20. The non-transitory machine-readable medium of claim 17, wherein determining the preferred payment instrument comprises:
communicating the merchant location information to a payment provider server; and receiving the preferred payment instrument from the payment provider server, wherein the preferred payment instrument indicates an additional payment provider server that is different from the payment provider server.

* * * * *